(12) United States Patent
Beaver et al.

(10) Patent No.: US 12,452,633 B2
(45) Date of Patent: Oct. 21, 2025

(54) TASK ORIENTED ASYNCHRONOUS VIRTUAL ASSISTANT INTERFACE

(71) Applicant: Verint Americas Inc., Alpharetta, GA (US)

(72) Inventors: Ian Beaver, Alpharetta, GA (US); Vladislav Luzin, Alpharetta, GA (US); Omer Glazer, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 562 days.

(21) Appl. No.: 17/875,810

(22) Filed: Jul. 28, 2022

(65) Prior Publication Data
US 2024/0040346 A1  Feb. 1, 2024

(51) Int. Cl.
*H04W 4/16* (2009.01)
*G06Q 30/016* (2023.01)
*H04M 3/493* (2006.01)

(52) U.S. Cl.
CPC ............ *H04W 4/16* (2013.01); *G06Q 30/016* (2013.01); *H04M 3/493* (2013.01)

(58) Field of Classification Search
None
See application file for complete search history.

(56) References Cited

U.S. PATENT DOCUMENTS

| 10,109,297 B2 | 10/2018 | Brown et al. | |
|---|---|---|---|
| 11,196,863 B2 | 12/2021 | Spohrer | |
| 2019/0340243 A1 | 11/2019 | Beaver | |
| 2019/0362252 A1 | 11/2019 | Miller et al. | |
| 2022/0094789 A1* | 3/2022 | Lau | G10L 15/26 |
| 2023/0402158 A1* | 12/2023 | Zavesky | G16H 10/40 |

* cited by examiner

*Primary Examiner* — Frantz Bataille
(74) *Attorney, Agent, or Firm* — Meunier Carlin & Curfman LLC

(57) ABSTRACT

An intelligent virtual assistant (IVA) is deployed to place a call/chat to customer service on behalf of the customer, thus saving them time and frustration. The IVA contacts a specific company over one or more channels, for example, chat, phone call, Application Programming Interface (API), or email, in order to complete open-ended task(s) requested by its user. Before the IVA contacts the company, a specific user profile is injected into an IVA dialog state. The IVA contacts the company or agency and answers customer service agent (CSA) questions by using the specific user profile provided for the call. The IVA then stores the task outcome for the user to review. If something prevents the task from succeeding, the IVA alerts the user that either it needs more information or the user may need to perform some action before the task can be completed, such as filling out or emailing a form.

20 Claims, 13 Drawing Sheets

| Key | First Name | Last Name | Address | City | State | ZIP | Date of Birth | Home Phone | Mobile Phone | E-mail Address | Account Number |
|---|---|---|---|---|---|---|---|---|---|---|---|
| 1 | Thomas | Smith | 123 Anywhere Street | Anytown | GA | 33220 | 1/1/2000 | 555-555-5555 | 555-555-5556 | none0@none.com | 11AA2288 |
| 2 | Scott | Johnson | 345 Anywhere Street | Anytown | GA | 33220 | 2/1/2001 | 555-555-5557 | 555-555-5558 | none1@none.com | 22AA3388 |
| 3 | Michael | Williams | 567 Anywhere Street | Anytown | GA | 33220 | 3/1/2002 | 555-555-5559 | 555-555-5560 | none2@none.com | 44AA5588 |
| 4 | Jeffery | Brown | 890 Anywhere Street | Anytown | GA | 33220 | 1/2/2000 | 555-555-5560 | 555-555-5561 | none3@none.com | 86AA7788 |
| 5 | Ann Marie | Jones | 234 Anywhere Street | Anytown | GA | 33220 | 2/2/2001 | 555-555-5562 | 555-555-5563 | none4@none.com | 88AA9988 |

*FIG. 3A*

| Key | Company | Purchase Date | Item | Ship Date | Shipping Service |
|---|---|---|---|---|---|
| 1 | Amazon | 4/2/2022 | Mouse Pad | 4/2/2022 | FedEx |

*FIG. 3B*

| Key | Airline | Departure Date | Departure Time | Flight Number | Departure City | Destination City | New Departure Date | New Departure Time | Upgrade |
|---|---|---|---|---|---|---|---|---|---|
| 2 | Delta | 4/5/2022 | 10:00 | 1234 | Atlanta | New York | 4/7/2022 | 8:00 | |
| 3 | American | 4/8/2022 | 6:00 | 334 | Philadelphia | Miami | 4/5/2022 | 13:00 | |

*FIG. 3C*

TASK ORIENTED ASYNCHRONOUS VIRTUAL ASSISTANT INTERFACE

CROSS REFERENCE TO RELATED APPLICATIONS

This application incorporates by reference U.S. patent application Ser. No. 17/815,685, entitled USER PERSONA INJECTION FOR TASK-ORIENTED VIRTUAL ASSISTANTS, filed concurrently herewith. This application also incorporates by reference U.S. patent application Ser. No. 17/875,790, entitled TASK GATHERING FOR ASYNCHRONOUS TASK ORIENTED VIRTUAL ASSISTANTS, filed concurrently herewith.

BACKGROUND

If a customer has a request or task to be performed by customer service, they must place a phone call to a customer service contact number or initiate a chat session themselves. This can be very time-consuming and frustrating to the customer if there are wait times, transfers to different departments, dropped calls, or other issues with the request or task. Further, automated systems may only support phone calls, while others are limited to specific tasks, so a customer may be unable to complete the task using automated methods.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In one embodiment, this disclosure includes a method of causing a virtual assistant service to fulfill a task request on behalf of a customer. The method includes receiving first task request data defining a first task at an intelligent virtual assistant (IVA) application running on a customer device; transmitting the first task request data to the virtual assistant service to fulfill the first task; receiving second task request data defining a second task at the IVA application; transmitting the second task request data to the virtual assistant service to fulfill the second task; and receiving updates at the IVA application regarding progress of the first task request.

In another embodiment, a computer system includes a memory having computer-executable instructions and a processor configured to execute the computer-executable instructions and cause the computer system to run an intelligent virtual assistant application; receive first task request data defining a first task at an intelligent virtual assistant (IVA) application running on a customer device; transmit the first task request data to the virtual assistant service to fulfill the first task; receive second task request data defining a second task at the IVA application; transmit the second task request data to the virtual assistant service to fulfill the second task; and receive updates at the IVA application regarding progress of the first task request and the second task concurrently underway on the virtual assistant service.

In another embodiment, a non-transitory computer readable medium stores instructions that, when executed by a processor of a processing system, cause the processing system to run an intelligent virtual assistant application; receive first task request data defining a first task at an intelligent virtual assistant (IVA) application running on a customer device; transmit the first task request data to the virtual assistant service to fulfill the first task; receive second task request data defining a second task at the IVA application; transmit the second task request data to the virtual assistant service to fulfill the second task; and receive updates at the IVA application regarding progress of the first task request and the second task concurrently underway on the virtual assistant service.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 1A illustrates the backend hardware used for the intelligent virtual assistant (IVA) to fulfill requested tasks, according to certain embodiments. FIG. 1B is a schematic illustration of a customer device having an IVA application installed thereon, according to certain embodiments. FIG. 1C illustrates one example of a destination entity that is equipped to fulfill a task via communications with the IVA of FIG. 1A, according to certain embodiments.

FIG. 2A illustrates simulated cards displayed on the graphical user interface of the customer device of FIG. 1B and used to track multiple tasks underway via the IVA of FIG. 1A, according to certain embodiments. FIG. 2B is a schematic illustration of functions available in a user interface of the customer device running an IVA application of FIG. 1B, according to certain embodiments. FIG. 2C is a schematic illustration of detailed descriptions available by activating the simulated cards shown in FIG. 2A, according to certain embodiments. FIG. 2D is a schematic illustration of the options for feedback communications back to the IVA of FIG. 1A from the customer device of FIG. 1B, according to certain embodiments.

FIG. 3A illustrates example customer information associated with a user profile according to certain embodiments.

FIG. 3B illustrates example dynamic information associated with a user profile according to certain embodiments.

FIG. 3C illustrates additional examples of dynamic information associated with a user profile according to certain embodiments.

DETAILED DESCRIPTION

Overview

Figure 1A:
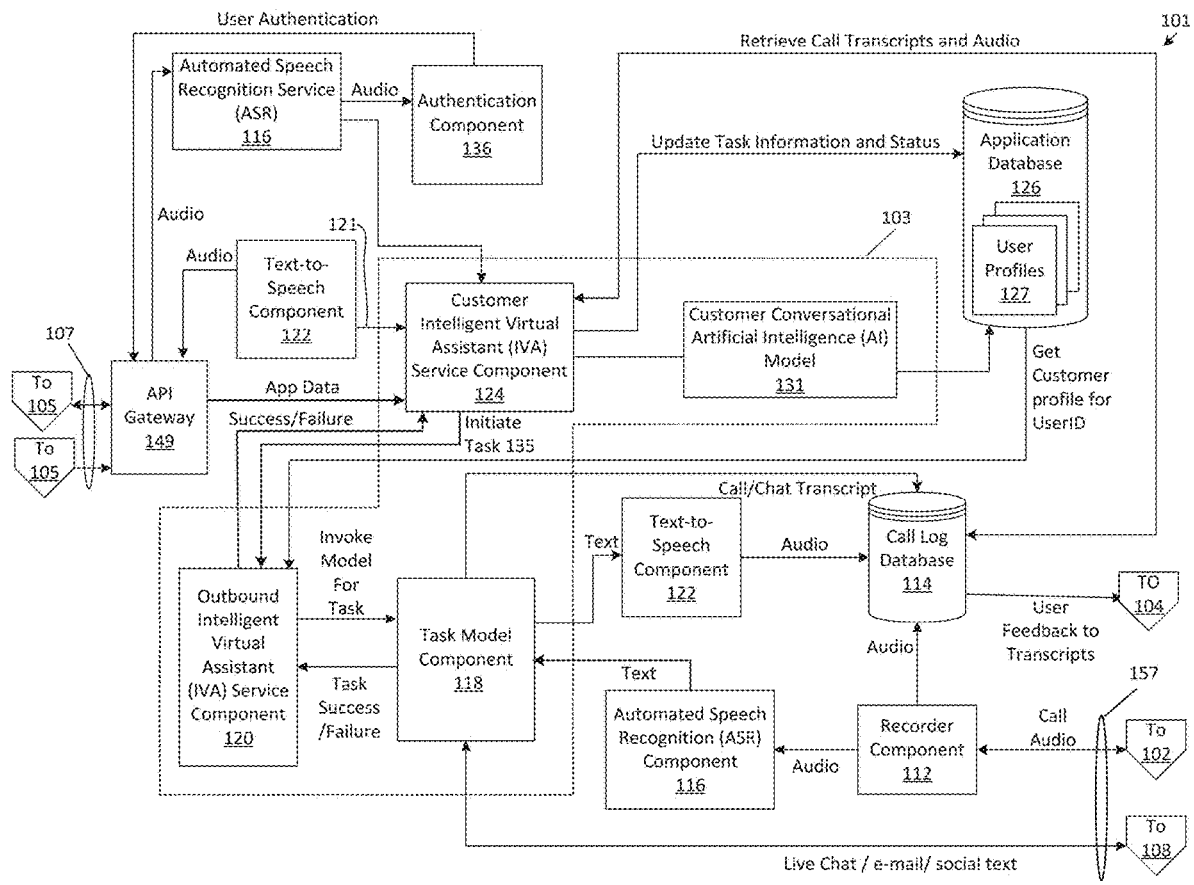
FIGS. 1A-1C are illustrations of an example system for user persona injection for task-oriented virtual assistants, according to certain embodiments.

The present disclosure is directed to a virtual assistant service and associated infrastructure that is deployed to place a call/chat to a destination entity on behalf of the customer. The "entity" may be a contact center, a business, a service provider, a government agency, a healthcare provider, a financial services organization, a person or other organization or individual.

The overall virtual assistant service includes a customer-facing intelligent virtual assistant (IVA) service component, referred to herein as the "customer IVA service component," and an outbound intelligent virtual assistant service component, or "outbound IVA service component," that has been previously trained to interact with the destination entity. The virtual assistant service optionally achieves asynchronous operation on a first communications link, directing task request data to the customer IVA service component, and a separate communications link directing communications from the outbound IVA service component to the destination entity fulfilling the task.

The outbound IVA service component may use one or more channels, for example and without limitation, chat, phone call, voice, text, Application Programming Interface (API), or email, in order to complete open-ended task(s) or requests made by the customer. An open-ended task includes, but is not limited to, any task that can be fulfilled by a third party entity in a bi-directional communication with a virtual assistant and/or a customer who provides information to the virtual assistant. Without limiting this disclosure, open ended tasks associated with this disclosure may often be completed via digital communications and software instructions that are ultimately implemented by computers. As discussed below, the outbound IVA service component may be configured to retrieve and compile task-oriented information that an entity can use to complete a task. Aspects of this disclosure assess whether the IVA has been previously trained on how to perform a requested task and what information is needed to perform that task. If the IVA has not yet been trained on the requested task, then the task can be added to a priority queue for future tasks that need to be trained. The priority for training a certain task can be increased in the priority queue if the training protocol for the task already exists but has not been completed.

The customer who makes a request or desires a task to be completed that requires communication with the entity can direct the outbound IVA service component to contact the fulfilling destination entity through a variety of methods such as text, speech, or UI controls. In order for the outbound IVA service component to perform such tasks, it creates and maintains a user profile in a database.

In order for the outbound IVA service component to perform such tasks, the overall virtual assistant service creates and maintains respective user profiles for individual customers in a database. The task-oriented information that the fulfilling destination entity needs can be obtained by a customer intelligent virtual assistant (IVA) service component requesting the information. For example, the customer IVA service component may utilize a form in an application user interface to retrieve the needed information from a source. In other embodiments, the customer IVA service component may retrieve the needed information from the source based on information provided by the customer, or by directly asking for specific information from the customer via a user interface, such as conversational interface (e.g., via voice or text/symbolic chat). With the user profile information and task information, the outbound IVA service component may inject information about a customer into conversational models in order to formulate channel-appropriate requests to the entity's customer service agent (CSA) in order to execute the request or task made by the user.

For example, a specific user profile is injected into an IVA dialog state such that the IVA dialog state includes information about the customer. In particular, the outbound IVA service component includes a response template like "My address is <address>" that is associated to a particular question. When a customer service agent asks a question, such as, "What is your current billing address?" the outbound IVA service component recognizes the intent of the question as "billing address", and then selects the response template associated to that intent, which would be "My address is <address>." The outbound IVA service component then uses the current user profile data to replace all occurrences of known variables in the user profile with the values. For example, if the user profile contained a variable "address"="123 N Stevens Ave, Spokane WA 99201", the virtual assistant service would inject or replace all occurrences of "address" in the template with that value to create a response of "My address is 123 N Stevens Ave, Spokane WA 99201", which would be sent to a text-to-speech component 122 to be communicated to the customer service agent associated with the entity.

The outbound IVA service component answers the customer service agent questions by using the conversational models and the user profile provided for the call. Upon completion, the outbound IVA service component stores the outcome for the customer to review. If something prevents the task from succeeding, the outbound IVA service component alerts the customer that either it needs more information or that the customer may need to perform some action before the task can be completed, such as filling out or emailing a form.

Example Environment and Processes

Figure 1B:
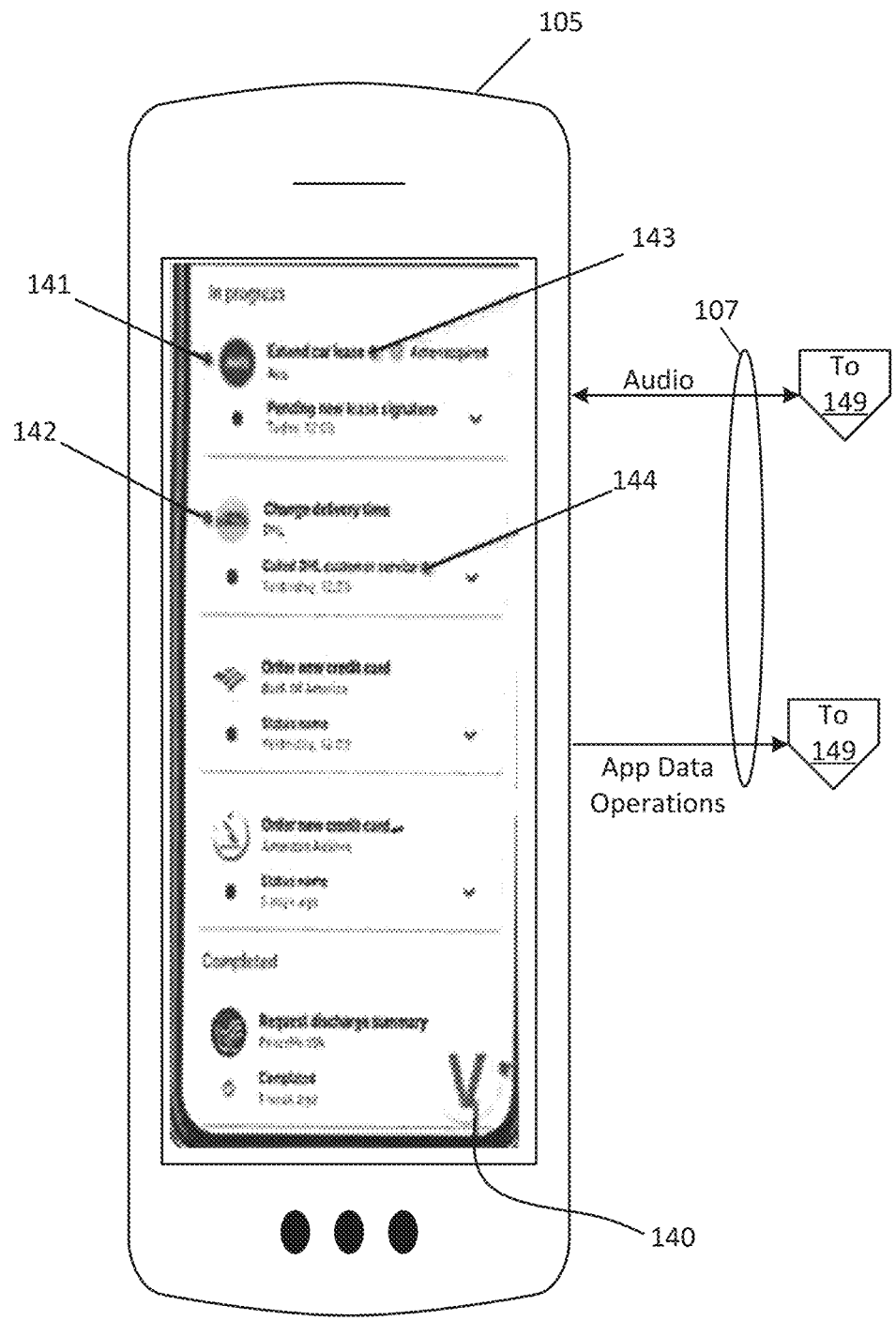
Figure 1C:
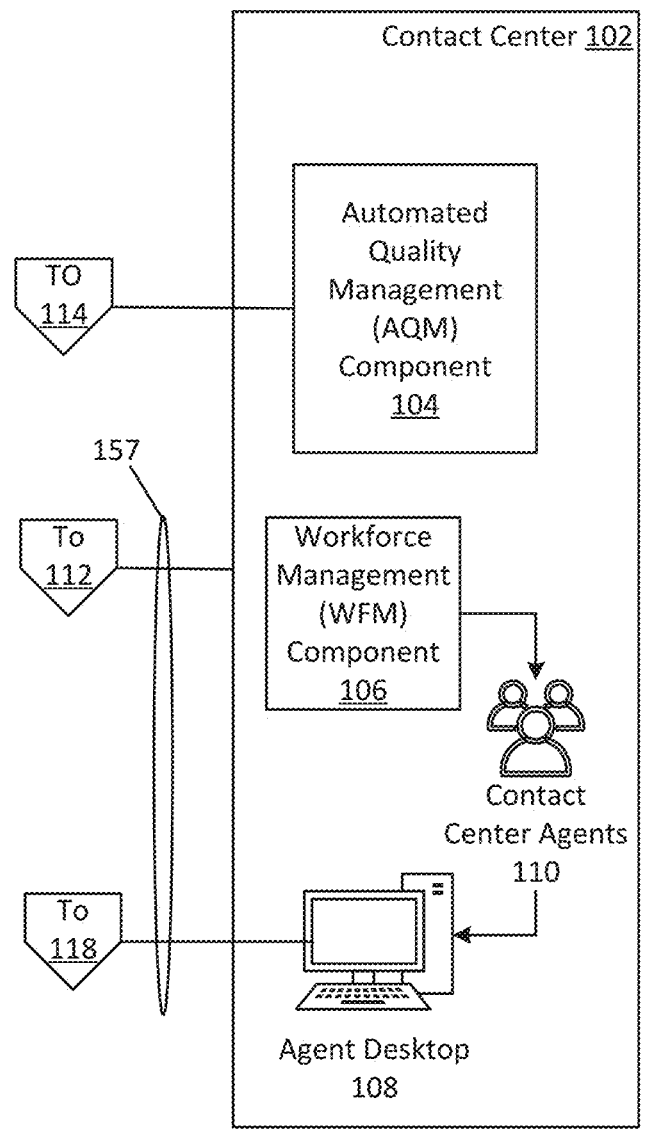

FIGS. 1A-1C illustrate an overview schematic of a system 101 that implements asynchronous task fulfillment for a plurality of requested tasks by utilizing an intelligent virtual assistant (IVA) application 140 operated on a computerized customer device 105 (FIG. 1B). The system 101 includes a first communications link 107 between the customer device 105 and a virtual assistant service 103 that includes a task model component 118, an outbound IVA service component 120, a customer intelligent virtual assistant (IVA) service component 124 and at least one customer conversational artificial intelligence (AI) component 131. The first communications link 107 is distinct from a separate communications channel 157 between the virtual assistant service 103 and a destination entity 142, including but not limited to a contact center 102 (FIG. 1C). The destination entity 142 can be any other party communicating with the virtual assistant service 103 and having the resources to fulfill the task at hand. The respective first communications link 107 and separate communications channel 157 allow the IVA application 140 on the customer device 105 to run the task fulfillment operations in the background while the customer device is actively engaged in other software driven activities operating on the customer device 105. As shown in FIG. 1A, multiple tasks may utilize the first communications link 107 to transmit task request data to the virtual assistant service 103. Each of the tasks may have different and separate communications channels 157 communicating with a respective destination entity 142 that is appropriate for the task at hand.

Non-limiting embodiments of the virtual assistant service 103 may be described relative to software components and associated computer hardware that implement the two distinct communications channels for efficient task fulfillment via a virtual assistant service 103. The first communications link 107 is configured to direct first task request data 117A to a customer IVA service component 124. The customer IVA service component 124 may include software programs implemented in computer hardware to prepare the task request data for use in the separate communications channel 157. After preparing the first task request data 117A received on the first communications link 107, the system 101 incorporates the separate communications channel 157 connecting the virtual assistant service 103 to the destination entity 142 that fulfills the task.

FIG. 1A includes telecommunications hardware and computerized services that allow for state-of-the-art handling of the first task request data 117A before it arrives at the customer IVA service component 124. For example, and without limiting this disclosure to any one embodiment, system 101 includes an application programming interface (API) gateway 149 that directs communications from the customer device 105 to the customer IVA service component 124. The API gateway 149 may also direct communications from the customer device 105 to an authentication component 136 that utilizes a biometric identification and verification service to ensure system security. The authentication component 136 of FIG. 1 is shown as utilizing an automated speech recognition component (ASR) 116 to implement a voice activated authentication process, such as voice biometrics. Of course, other authentication services may be used in conjunction with the system 101 of FIGS. 1A-1C. In some non-limiting embodiments, the ASR component 116 may also include speech to text software to send communications from the customer device 105 as first task request data 117A in text format to the customer IVA service component 124. In an alternative embodiment, also shown in FIG. 1A, the ASR component 116 may utilize a separate text to speech component 122 that services the overall intelligent virtual assistant 103 to ensure that first task request data 117A arrives at the customer IVA service component 124 in a proper format. The system 101 is configured with the customer IVA service component 124 receiving first task request data 117A from a customer device 105. The customer IVA service component 124, in turn, is in data communication with at least one, and possibly several, customer conversation artificial intelligence (AI) components 131 to complete specialized language processing steps, including but not limited to, natural language processing (NLP), language parsing, language tokenization, context and concept classification, data labeling, and intent recognition from the first task request data 117A. The customer IVA service component 124 receives requests from the customer device 105 associated with the customer and sends task requests to the outbound IVA service component 120 and receives task success/failure information from the outbound IVA service component 120 after a task executed.

User profiles 127 are stored in an application database 126 in a data structure. Each customer's user profile 127 is a data record where user information is stored. A typical user profile contains a first class of information that is static or relatively unchanging information, such as a user's first name, last name, username, mailing address, and email address. In accordance with the present disclosure, each customer's user profile 127 contains a second class of information that is dynamic task oriented information, such as package tracking number, repair date, delivery address, product name, purchase date, airline information, etc. FIGS. 3A, 3B and 3C illustrate examples of both classes of information that is contained in the user profile 127. The customer's user profile is injected into the conversational models in order to formulate channel-appropriate requests to the contact center 102 in order to execute the request or task made by the customer. For example, a script may be prepared from the conversational models having delexicalized variable names and the delexicalized variable names are mapped to respective names of the data within the user profile 127.

These specialized steps are further enabled by the virtual assistant service 103 maintaining communications with the application database 126 that may be operated in local servers, remote computers, or cloud based computing devices.

The system 101 is adapted to use the above-described components with incoming first task request data 117A and provide more content rich task instructions 135 for use in the separate communications channel 157, linking the virtual assistant service 103 to the task fulfilling destination entity 142. The task instructions 135 may include an identification of the destination entity 142 that will fulfill the task, the intent or object of the task instructions, and a selected communications channel for the virtual assistant service 103 to engage in bi-directional communications with the destination entity 142.

The outbound IVA service component 120 receives the task instructions 135 from the customer IVA service component 124. Similar to the above specialized language processing steps, the outbound IVA service component 120 is in data communication with at least one task model component 118 that includes a library of available pre-trained conversational models that can be organized by particular task, company, or industry. The task model component 118 takes advantage of numerous communication processing tools (i.e., text to speech components 122, automated speech recognition (ASR) components 116, recording devices 112, and call log databases 114) to implement the task instructions 135 with a destination entity 142 on numerous available communications channels (i.e., chat, text, voice, or video 121).

In regard to providing the first task request data 117A to the virtual assistant service 103, this disclosure encompasses a system 101 for task fulfillment by the virtual assistant service. The system includes a customer intelligent virtual assistant (IVA) service component (the customer IVA service component 124) that operates on a computer or multiple connected computers to implement the virtual assistant service. A first communications link 107 is configured to transmit first task request data 117A to the customer IVA service component 124. A customer conversational artificial intelligence component 131 is trained to utilize a processor in communication with the computer(s) to extract a destination identifier 414 from the first task request data 117A. The customer conversational artificial intelligence component 131 may include numerous models and algorithms, at least one of which is trained to classify an intent 430 of the task request data; other models may also be trained to select a communications channel 422 for communicating with a destination entity 142 to fulfill the intent of the first task request data 117A. The computer forms task instructions 135 that may include the destination identifier, the intent of the task request data, and a selected communications channel. The customer IVA service component 124 sends the task instructions 135 and associated data to an outbound IVA service component 120 configured for receiving the task instructions 135 from the customer IVA service component 124. In some embodiments, a separate communications channel 157 is connected between the outbound IVA service component 120 and the destination entity 142, wherein the separate communications channel 157 operates without directly accessing the first communications link 107. This disclosure shows how a virtual assistant service 103 may provide a customer device 105 with asynchronous access to multiple instances of the task, as shown in FIGS. 2A-2D, by separating the communications occurring in real time with the customer facing portion of the virtual assistant service 103 (such as the customer IVA service component 124) and the destination facing portion of the virtual assistant service 103 (the outbound IVA service component 120). The system 101, therefore, may include designated communications links for input and output sections of the virtual assistant service 103. The first communications link 107 transmits data between a customer device 105 and the virtual assistant service 103, and a separate communications link transmits other data between the virtual assistant service 103 and a destination entity 142. The first communications link 107 and the separate communications channel 157 are connected via the hardware and software of the virtual assistant service 103, as shown in FIGS. 1A-1C.

FIG. 1A illustrates one non-limiting example of components that may be encompassed with the virtual assistant service 103, while other components of the system 101 are illustrated separately but in communication with the virtual assistant service 103. Without limiting this disclosure in any way, the virtual assistant service 103 is shown in FIG. 1A as including at least a customer IVA service component 124, a customer conversational artificial intelligence component 131, an outbound IVA service component 120, and a task model component 118.

The outbound IVA service component 120 receives the task instructions 135 from the customer IVA service component 124. Similar to the above specialized language processing procedures, the outbound IVA service component 120 is in data communication with at least one task model component 118 that includes a library of available pre-trained conversational models that can be organized by particular task, company, or industry. The task model component 118 takes advantage of numerous communication processing tools (i.e., text to speech components 122, automated speech recognition (ASR) components 116, recording devices 112, and call log databases 114) to implement the task instructions 135 with a destination entity 142 on numerous available communications channels (i.e., chat, text, voice, or video).

In the system 101, the recording devices 112 may capture call audio with phone calls conducted between customers and the contact center agents 110. In some implementations, screen activity associated with the agent desktop 108 may be captured. The audio (and screen activity) may be recorded and stored in a call log database 114 so that it can be evaluated according to business needs. An automated speech recognition (ASR) component 116 may receive recorded audio from the recording devices 112. The automated speech recognition (ASR) component 116 may utilize techniques such as acoustic models to translate received audio soundwaves into phonemes and language and pronunciation models to form words from the phonemes. The automated speech recognition (ASR) component 116 creates transcripts of calls between the customers and contact center agents 110 that are input to the task model component 118.

The task model component 118 accesses a library of available pre-trained customer conversational Artificial intelligence (AI) components 131 that can be organized by specific task, company, or industry. For example, there could exist an airline company that has specific terminology or business properties that differentiate it enough from other airline companies that a custom model is required for performance reasons. Furthermore, there may exist some complex task that requires a custom model to be created to enable a successful outcome for the task. A pre-trained conversational AI model is loaded into a dedicated process for each conversation so that it can converse with a customer service agent on any particular topic the model was trained for. Additionally or alternatively, the task model component 118 may include Machine Learning (ML) models.

The task model component 118 may include a neural network or statistical classifier that takes in the utterance from a customer service agent and either predicts the appropriate response from a database of existing responses or it can be made to generate text directly to be passed to the Text-to-Speech component 122 to respond with. For example, if a customer service agent were to ask the virtual assistant service 103 the purpose of calling, the model it has loaded may be trained to respond with "I would like to purchase a ticket on behalf of customer <account ID>." The value for the variable <account ID> in the generated response can then be inserted from the user profile. This rendered text would then be passed to the Text-to-Speech component 122 to generate an audio form of the text to be played over the telephone network.

Such customer conversational artificial intelligence (AI) model 131 for the IVA can be created through various means. Typically, they involve labeling conversation data between humans with each participant's intention or purpose of an utterance; the dialog state up to the current point in a conversation and any actions that need to be performed at each turn in the conversation. This labeled data can then be used to train a model that, given a conversation history up to a point, will then predict the current customer intention, dialog state, and action to be taken. This conversation training data is typically delexicalized to remove company and participant-specific terminology. For example, the utterance "I would like to fly to Dallas on February second," could be delexicalized as "<actor> would like to fly to <destination_city> on <departure_date>," which allows the model to learn task structures without encoding dynamic information.

The outbound IVA service component 120 loads the appropriate conversational model for the channel from the task model component 118 to service a customer request. The outbound IVA service component 120 may be implemented with a single end-to-end model that learns the intentions, state, and action concurrently, or it could be implemented with individual models for intent classification, dialog state tracking, and action determination. The outbound IVA service component 120 may be trained on large volumes of log files from the channel being learned, such as call transcriptions, live chat transcripts, or email threads. The outbound IVA service component 120 is trained to follow the conversational behaviors of the customers in these logs as they navigate the task to completion with contact center agents. Once trained, the outbound IVA service component 120 is able to act on behalf of a customer using the same channel of the training data, but the responses will be generated in a delexicalized format.

FIGS. 1A and 1C illustrate that the above noted separate communications channel 157 is used for ultimately fulfilling a task with the destination entity 142, which associated with the contact center 102 in the non-limiting example of FIG. 1C. In one non-limiting example, the system uses the virtual assistant service 103 for communicating back and forth with the contact center agent 110 until the task is successfully completed, failed, or a determination is made that there is a need for more data from the customer device 105. As shown in FIGS. 1A and 1C, communications between a virtual assistant service 103 and contact center 102 often allow for using numerous channels of communications in voice, text, and video domains. These channels are also subject to quality control, training, and internal process management via the shown workforce management component 106 or automatic quality management (AQM) component 104.

The contact center 102 may be associated with an entity that is the recipient of a customer request or task and may manage interactions between a customer and the contact center agents 110. The contact center 102 may utilize omnichannel communications to connect customers with the contact center agents 110, who are customer service or sales professionals who handle interactions with a customer by phone, email, live chat, social media, Short Message Service (SMS) messaging, and support tickets. A transaction history of the customer interactions over the various channels is maintained by the contact center 102. For example, if a customer initiates a chat session, the information from the chat session is available to the contact center agents 110 should the customer decide to ask to speak with one of the contact center agents 110 while chatting.

The AQM component 104 automatically screens calls between customers and contact center agents 110 to determine if any of the interactions are non-compliant. For example, the interactions between the customers and contact center agents 110 may be measured against a set of rules such that the interactions are scored against a set of standards. Contact center agents 110 that are found not to be in compliance with standards may be provided coaching to improve their compliance.

The workforce management (WFM) component 106 is used in forecasting and scheduling of contact center agents 110 in the contact center 102. With an understanding of the skill sets and preferences of the contact center agents 110, the WFM component 106 aligns the contact center agents' skills with forecasted needs to derive staffing schedules within the contact center 102. The WFM component 106 may also provide options for the contact center agents 110 to request time off, shift swaps, and task switching.

The agent desktop 108 is a computing device running one or more applications that provide unified access to the applications and information used by the contact center agents 110 handling interactions with customers. The agent desktop 108 may be implemented using a variety of computing devices such as smartphones, desktop computers, laptop computers, and tablet-based computing devices. Other types of computing devices may be supported.

The separate communications channel 157 used to fulfill respective task instructions 135 is bi-directional with numerous other computerized components to send status data, additional data requests, or other useful information back to the customer device 105 via the customer IVA service component 124. In this way, the IVA application 140 on the customer device 105 can be made aware, via the first communications link 107, of at least one requested task being processed asynchronously with the virtual assistant service 103. The customer device 105 also receives an indication of the destination entity 142 receiving the task instructions and working with the virtual assistant service 103 to complete the requested task. Accordingly, the customer device 105 can track task state 144 for any given requested task. When more than one requested task is operating in the background of an active customer device 105, the IVA application 140 on the customer device 105 has software to arrange the different tasks on a graphical user interface in simulated cards 141 for each respective task underway. The IVA application 140 may be in communication with the above noted application database 126 to maintain management of the task name for the first task 143, the task state 144, and the destination entity 142 fulfilling the task. The simulated cards 141 shown on the customer device 105 may be configured to have an alert indicator if a requested tasks needs attention by the customer using the customer device.

Referring again to FIG. 1B, on a main page of the IVA application, the customer may see a list of tasks that are currently running in a backend of the virtual assistant service 103 on the customer's behalf. For each task, the list on a graphical user interface may include task name for the first task 143, current task state 144, and a third party or destination entity 142 involved in completing the task. The customer may also see or be provided with the ability to display a list of tasks that have been completed by the IVA application. If there is input or action needed to be performed by the customer, a card may have an alert indicated on it, as well as a potential notification in the mobile device or browser. If the customer would like to input a new task the customer can launch the virtual assistant using a launch button on the IVA application 140 and state the task over voice or text. Upon receipt of an input for a new task, the new task is provided to the virtual agent via the virtual assistant service 103 to be sent to the contact center 102.

Figure 2A:
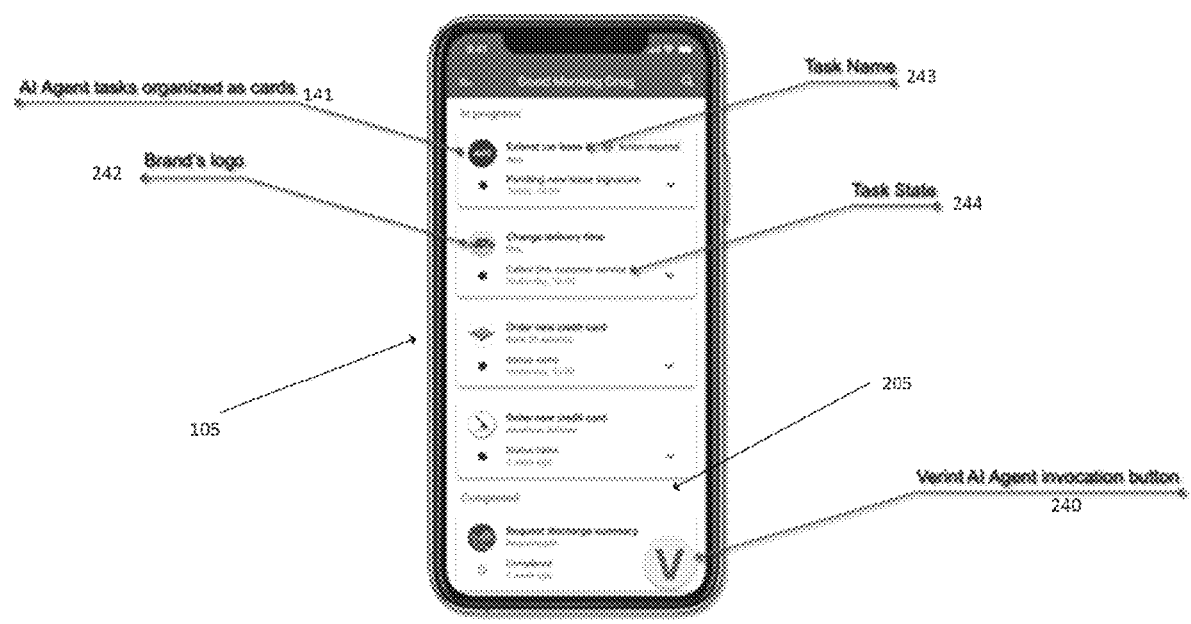
FIGS. 2A-2D illustrate a customer device and graphical user interface running on the customer device for interacting with a customer intelligent virtual assistant service component.

Referring to FIG. 2A, to facilitate operation of an IVA on behalf of the customer, the customer may interact and initiate IVA tasks via an application running on a graphical user interface (GUI) 205 on a customer device 105, such as a smartphone, desktop computer, laptop computer, tablet, or the like. The customer device 105 may or may not include audio communication capability, e.g., to allow the customer to engage the system via an audio interaction such as a second communications channel 113 (for example and without limitation an audio channel), as illustrated in FIG. 1A.

As illustrated in FIG. 2A, artificial intelligence tasks on behalf of the customer are displayed and organized as simulated cards 141 corresponding to one or more tasks on behalf of the customer. Each of the simulated cards 141 provides information to the customer for tasks running in parallel with one another. For example, in the illustrated embodiment, a simulated card 141 may include the brand logo 242 of a destination entity 142 that is the object of a task running on behalf of the customer. In other non-limiting embodiments, the simulated cards 141 may include a task name or other identifying information and a task status or other information such as updates 244 on the progress of the task. The graphical user interface may further include a launch button 240, which invokes the artificial intelligent virtual agent running in the background (for example, via a network illustrated in FIGS. 1A and 1C) on behalf of the customer.

That is, the graphical user interface 205 is a "front-end" input portal that allows the customer to activate or invoke the IVA to act on the customer's behalf according to principles described herein. Using the graphical user interface 205, the customer has the ability to launch new tasks, end tasks and to view and interact with any of the asynchronous tasks currently running on the customers behalf, as displayed via simulated card 141 in the graphical user interface 205. The simulated cards 141 may be displayed in any order, including, for example, in a task timeline order, alphabetical or custom order, as provided by the customer. The application may also allow the customer to view past tasks and information related to those past tasks, including the resolution of the task.

Referring again to FIG. 1A, the system 101 includes a database that contains a set of tasks that have been created, e. g. task model component 118. For example, a database repository may include a library of tasks available to the customer, and may be organized by topic, task, company or industry, or the like. The IVA application 140 running on the customer device 105 may be implemented using any dialog system framework or toolkit. Once the customer has actuated the IVA application 140 with the actuating button 240 and stated a request over speech or text, the IVA application 140 activates the customer IVA service component 124 via the graphical user interface 205. The first task request data 117A is sent to the backend virtual assistant service 103, which can be implemented using any number of dialog management toolkits or methods. The virtual assistant service 103 may make use of customer conversational artificial intelligence (AI) model 131 to recognize the input from the user and identify the task.

As illustrated in FIG. 1A, communication between the customer device 105 and the virtual assistant service 103 may be made via first communication link 107 to an API gateway 149. The API gateway 149 may pass the request directly to a customer intelligent virtual assistant service component 124 or may pass the request to an authentication component 136 for authentication of the customer. An automated speech recognition (ASR) component 116 may be implemented for authentication of the customer (by passing an audio portion of the communication from the customer to the authentication component 136, using, for example, voice biometrics). After authentication and transmission of the first task request data 117A, the request may be provided to the customer IVA service component 124. Within the system, the customer IVA service component 124 accesses an application database 126 for providing user profiles, accessing task information and status updates, and confirming customer information and any other appropriate information. The application database 126 is configured to communicate to and from the API 149 and graphical user interface 205 running on the customer device 105.

Figure 2B:
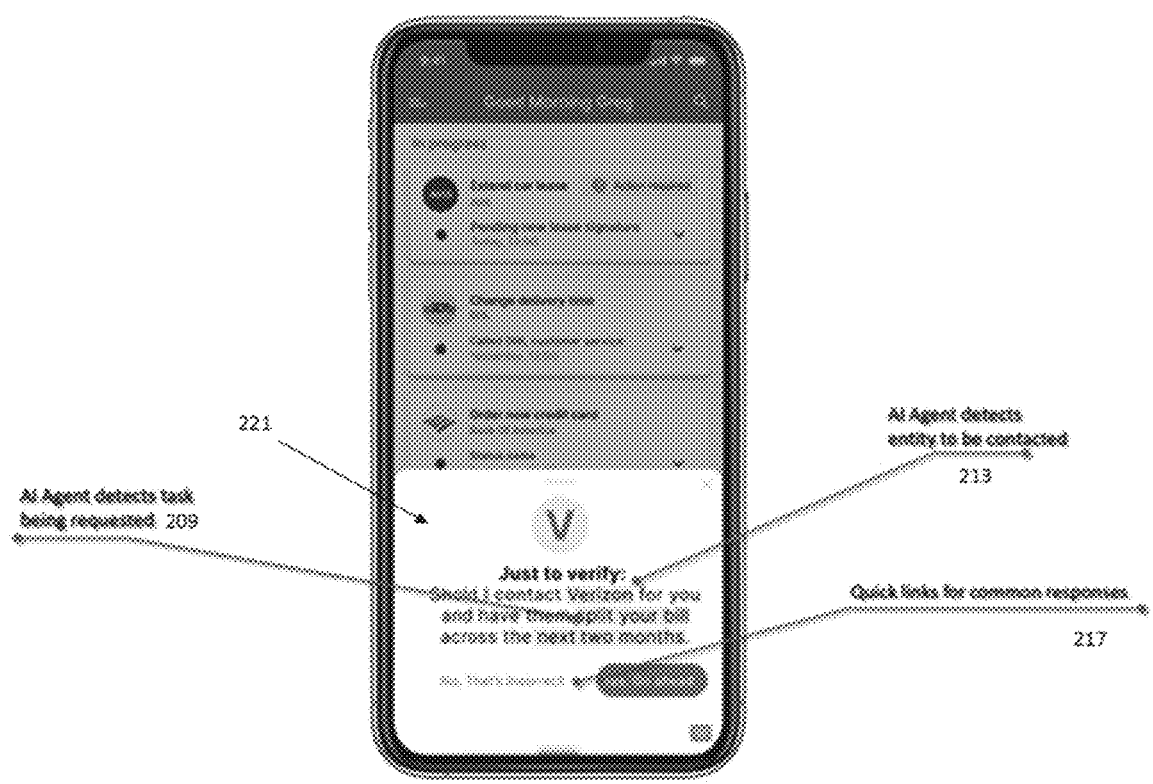

Once the first task request data 117A is received from the customer, the IVA application 140, running via the graphical user interface 205 or a different audio component (not shown) on the customer device 105, may provide information related to the task to the customer IVA service component 124. In some embodiments, the IVA application 140 is configured to receive a notifier back from the virtual assistant service 103 that the customer IVA service component 124 has interpreted the first task request data 117A in a certain way and requests confirmation that the task requested was properly understood by the customer IVA service component 124. For example, as illustrated in FIG. 2B, the GUI 205 may display text defining the task 209 and may, for example, highlight pertinent information such as the entity to be contacted 213 such as a business or agency and/or the primary task it is being asked to be performed on the customer's behalf with the customer IVA service component 124. The GUI 205 may also display quick links for common responses 217, for example, to confirm that the task displayed is the task requested.

Although shown here as a request for confirmation of a task requested by the customer, the display window 221 may display other information or request other information of the customer, such as identifying additional information needed to prepare the task requested or requesting customer profile data, or the like. Although not shown, the GUI 205 may provide text or speech input mechanisms for receiving additional information from the customer or may provide common quick responses, as illustrated with respect to the confirmation of the task requested (as shown in FIG. 2B).

Upon confirmation or correction of the task by the customer, the customer IVA service component 124 may begin the requested task and the graphical user interface will display a new simulated card 141 to show the state of the new task being performed on behalf of the customer as a result of the request. If additional information is needed to perform the task, such as a package tracking number or customer profile information, it will be requested from the user at this time. Once the task is confirmed and information is collected, the customer intelligent virtual assistant (IVA) service component 124 will initiate the task instructions 135, and the task will be added to the task model component 118, among other tasks, via the outbound intelligent virtual assistant (IVA) service component 120 and a new background AI agent process in the customer intelligent virtual assistant (IVA) service component 124 will be created to perform the task and update the application database 126 with the task progress. A new simulated card 141 will appear in the GUI 205 to show the state of the new background task to the user.

Figure 2C:
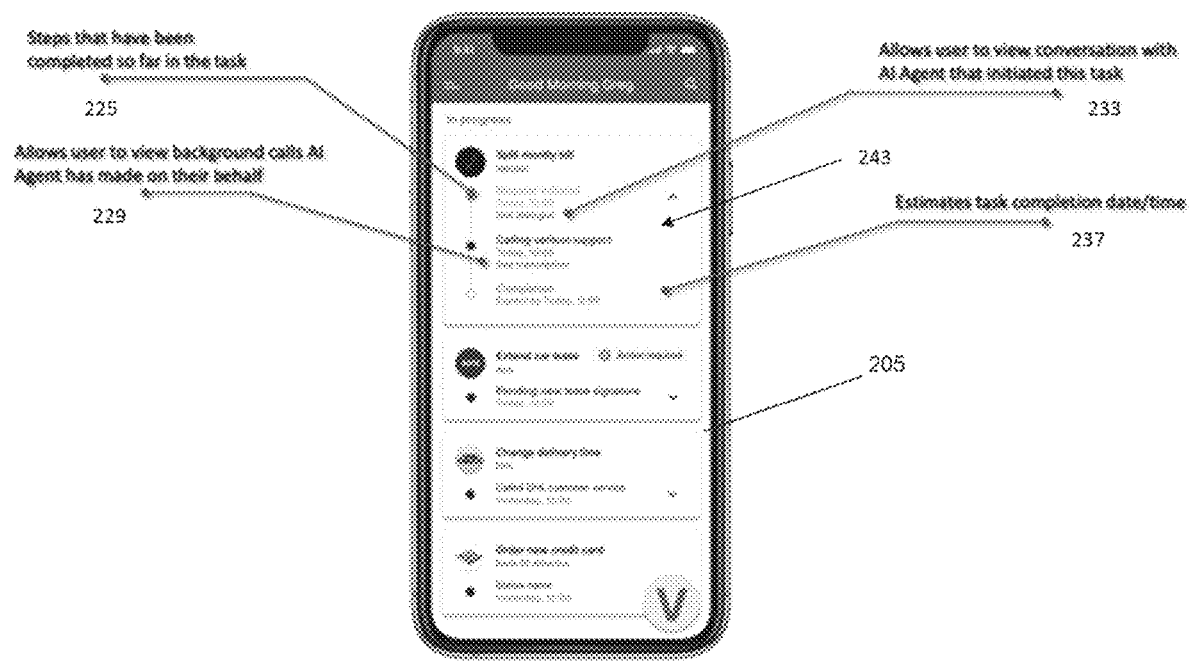

Referring to FIG. 2C, the graphical user interface 205 may allow for expanding any of the simulated cards 141 to display further information related to the task. In an alternative embodiment, an expanded task card 243 itself may present as an expanded display with more detailed information as a default mode, and the user may "scroll" through to get to task cards not visible on the display screen. For example, if a customer clicks on a specific simulated card 141 as illustrated in FIG. 2A, the simulated card 141 expands to show the task timeline, as illustrated in FIG. 2C. In the illustrated example, at the top is the task creation event. The expanded task card 243 with more detailed information may display such information as steps that have been completed thus far in the second task 225, background calls the AI has made on behalf of the customer 229, conversations with the AI agent that initiated the task 233, estimates to completion of the task 237, such as date, time, or duration, and any other status information as may be appropriate for a requested task.

Figure 2D:
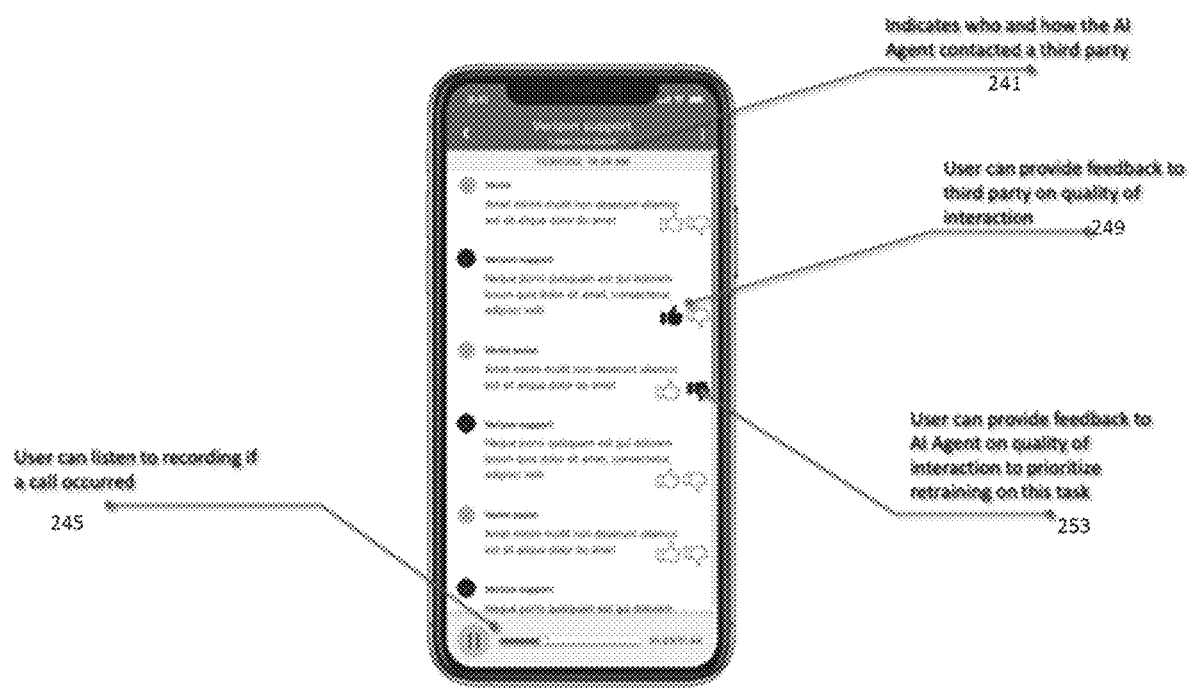

As illustrated in FIG. 2D, the customer can view the transcript of the conversation with the customer IVA assistant that created the task if for example the customer does not recall some details of what the task was for. The GUI 205 may display who and how the IVA assistant contacted a third party 241, provide a means by which the customer can listen to a recording of a call if a call occurred 245, and displays a list of steps the customer IVA has taken so far in completing the task. If the customer IVA has contacted outside parties to complete the task, for example a contact center, the logs or transcripts of any external communications are made available to the user for auditing the performance of the assistant. The GUI may also provide input that allows the customer to provide feedback to the third party (or entity) on the quality of the interaction via the customer IVA 249 and/or to provide feedback to the customer IVA 253 on the quality of the interaction and/or prioritization of the task. While illustrated in FIG. 2D as a "thumbs up"/"thumbs down" toggle button, other feedback mechanisms, including other "button" inputs, and/or textual or audio input mechanisms may be provided.

For example, in the transcript log view of FIG. 2D, the user can provide feedback by grading the quality of the interactions between the customer service representative and the virtual agent. Feedback can be in the form of thumbs up/down or a Likert scale. Feedback on customer service representatives can optionally be shared with the third party provided the third party contact center is running complementary systems. Feedback on the quality of the intelligent virtual assistant interactions may be saved to later improve the performance of the backend dialog system. Thus, in the present configuration, customers can have a virtual assistants perform tasks on their behalf.

After the task is commenced by the customer IVA on behalf of the customer, the next step may be either the task completion outcome (success or failure), a request for information from the user if the assistant is stuck (e.g. a tracking number is needed to complete the task), or an estimated task completion date and time.

According the presently described systems, the disclosed IVA assistant application allows for performing multiple background tasks on behalf of a customer, with the customer having interaction with the customer IVA service component 124 via a graphical user interface 205, a first communications link 107, and an API gateway 149.

Current assistant interfaces are designed for synchronous communication between the assistant and the user, where one task is in process at a time. For example, "smart" interfaces such as Google Assistant, Amazon Alexa, Apple Siri, Samsung Bixby are designed for synchronous communication with the user and are single task in nature, meaning the user has to wait for the assistant to complete the current task before they issue a new task. If such known "smart interface" is performing a time consuming background task, the user waits for a response before continuing and a current task must be completed live with the assistant before starting a new task. According to principles described herein, the disclosed IVA assistant application allows for performance of numerous time consuming tasks on behalf of the user concurrently. As described herein, the graphical user interface 205 allows the user to see the progress of each task and provide information related to each task as needed or desired. The graphical user interface 205 incorporates the ability for the user to see the progress of all tasks, see detailed information of what the assistant is doing on behalf of the user in each task, and for the user to provide feedback on the quality of the assistant in performing a task, which may be used to prioritize retraining of the assistant on that task.

FIGS. 3A-3C illustrates example information that may be included in the user profile that is stored in the application database, according to certain embodiments. In accordance with the present disclosure, there may be two classes of information stored in the user profile that may be used by the outbound IVA service component 120. As shown in FIG. 3A, the first type of information is customer information 300 or identifying information such as name, birthdate, address, phone number, account number, etc. The customer information 300 may be stored in a data structure, for example, a delimited text file, a JSON file, a XML, or a SQL database. FIG. 3A illustrates an example of customer information associated with five customers. According to certain embodiments customer information 300 may be relatively unchanging and considered to be static, although there may be changes from time to time as customer information changes (e.g., address, phone number, name, etc.). The customer information 300 may be obtained by the customer IVA service component 124 through an application settings page, conversationally by the IVA asking for specific information from the customer, or by linking the IVA application to a third-party identity provider such as Google or Microsoft.

In accordance with the present disclosure, the second class of information is dynamic task oriented information, such as package tracking number, repair date, delivery address, product name, purchase date, airline information, etc. FIGS. 3B and 3C illustrate example of dynamic information associated with the customers in FIG. 3A. For example, FIG. 3B illustrates dynamic customer purchase information 310 associated with customer number 1, in particular, information associated with a purchase of goods or services. In another example, FIG. 3C illustrates dynamic customer flight information 330 associated with customer numbers 2 and 3, in particular, airline travel information that these customers would like to reschedule.

Figure 4A:
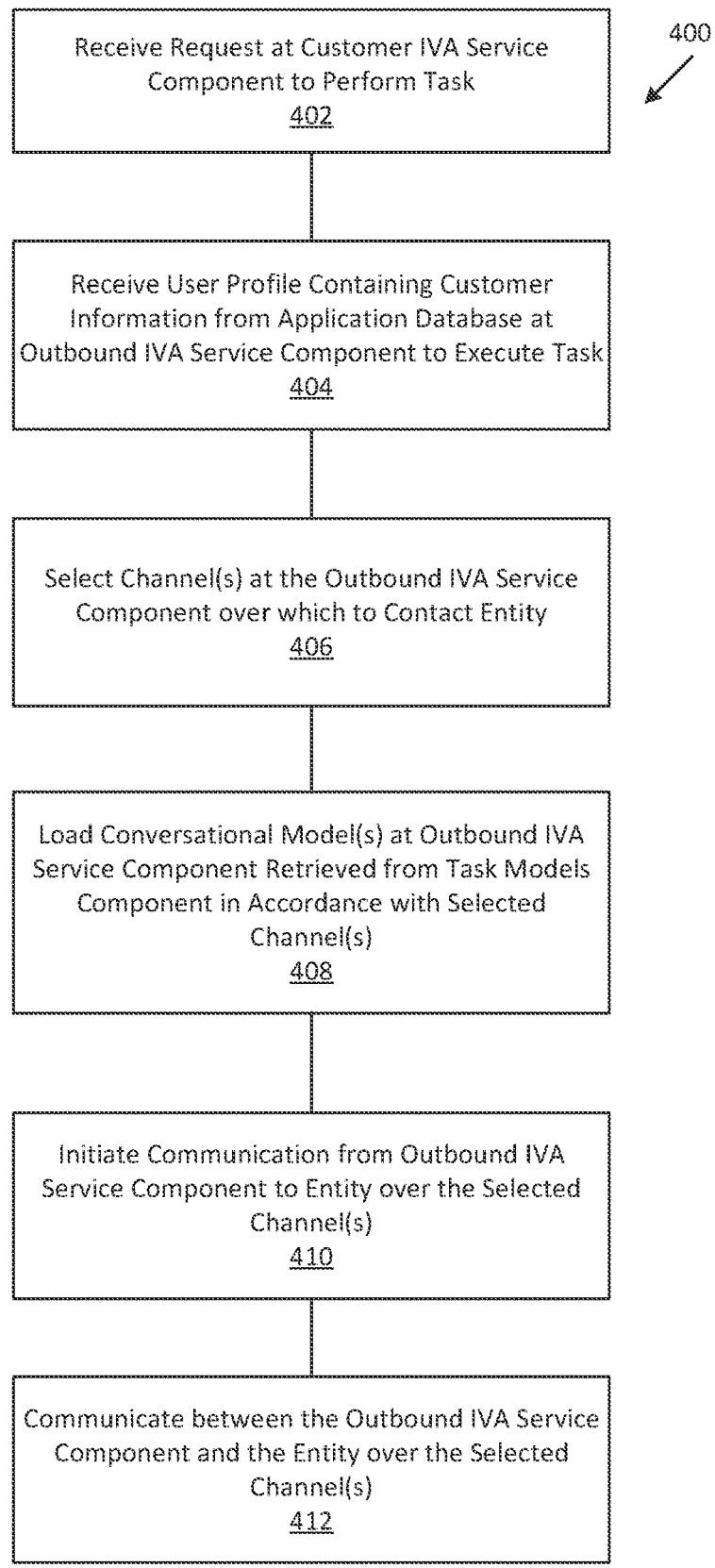
FIG. 4A is an example flow diagram of operations performed to receive a task and select channel(s) and conversational model(s) to contact an entity associated with the task according to certain embodiments.

FIG. 4A illustrates an example flow diagram 400 of operations performed by the virtual assistant service 103 according to certain embodiments. At block 402, a request to perform the task is received at the customer IVA service component 124. A request may be received from the customer device 105, such as, a smartphone, desktop computer, laptop computer, tablet, at the customer IVA service component 124 to perform a task on behalf of the customer. For example, Thomas Smith may request that the outbound IVA service component 120 track a package purchased on Apr. 2, 2022. In another example, Scott Johnson or Michael Williams may wish to change their flights to new departure dates and new departure times by inputting their requests into their customer device 105, which are received by the customer IVA service component 124.

At block 404, the user profile 127 containing customer information (FIG. 3, 300, 310 and/or 330) to execute the requested task is received by the outbound IVA service component 120 from the application database 126. For example, the outbound IVA service component 120 may query the application database 126 to retrieve the user profile 127 and the relevant customer information 300, 310 and/or 330 to execute the requested task.

At block 406, a channel(s) is selected by the outbound IVA service component over which to contact an entity associated with the request. Once the outbound IVA service component 120 has obtained all of the information necessary to perform the desired task, the selection of which channel(s) to contact the entity may be made based on cost, speed, urgency, etc. the channels may include, but are not limited to SMS message, email, post on social channels, connect to live chat, audio, or an API connection to the entity that is to be contacted to perform the task. The appropriate channel to be used to contact the entity may be selected by an algorithm (such as a channel selection algorithm that is a decision tree with weights, a set of rules, and/or business logic) based on current estimations of task completion, wait times, monetary cost, support contract, etc. Alternatively, the channel to be used may be specified by the customer.

At block 408, the customer conversational artificial intelligence component 131 in accordance with the selected channels are loaded by the outbound IVA service component 120. As noted above, the task model component 118 includes a library of available pre-trained customer conversational artificial intelligence (AI) model 131 that can be organized by specific task, company, or industry. The outbound IVA service component 120 loads the appropriate one or more of the conversational models stored by the task model component 118 to complete the request.

At block 410, communication between the outbound IVA service component 120 is initiated over the selected channel(s) using the loaded customer conversational artificial intelligence (AI) model 131 and the user profile 127. For example, outbound IVA service component 120 may create a new process to place a telephone call, SMS message, email, post on social channels, connect to live chat or initiate an API connection to the entity as determined in 406. At block 412, communication between the outbound IVA service component 120 and the destination entity 142 is performed over the selected channel(s).

In another embodiment at block 408, the outbound IVA service component 120 may perform automated authentication on behalf of customers. As part of contacting an entity, one or more verification steps are typically performed to prove the caller's identity. These verification steps involve the customer service agent asking the caller for data known to both the company and the caller but is not public. Examples may include but are not limited to, account numbers, last payment amount, PIN numbers, or card numbers. When the outbound IVA service component 120 connects to a contact center 102 on behalf of its customer, the outbound IVA service component 120 can have this verification data stored as part of the customer profile. When contact center agents 110 ask for verifying information, the outbound IVA service component 120 can use the profile to answer these questions and authenticate the call or chat conversation without the need to connect with the customer to verify their information.

In one embodiment, a computer implemented method of requesting task fulfillment from a virtual assistant service 103 includes the procedure of receiving first task request data 117A at a customer intelligent virtual assistant (IVA) service component 124 of the virtual assistant service 103 operating on a computer or multiple computers in data communication (i.e., cloud computing). By extracting a destination identifier 414 from the first task request data 117A, classifying an intent 430 of the task request data, and selecting a communications channel for communicating with a destination entity 142 to fulfill the intent of the task request data, the method forms task instructions 135 including the destination identifier, the intent of the task request data, and a selected communications channel. The method further includes sending the task instructions 135 to an outbound IVA service component 120 of the virtual assistant service 103.

The customer device 105 transmits the first task request data 117A on a first communications link 107 to the virtual assistant service 103. The first communications link 107 is distinct from a separate communications channel 157 established between the outbound IVA service component 120 of the virtual assistant service 103 and the destination entity 142. Upon receiving the first task request data 117A, a computer implemented method includes utilizing a customer conversational artificial intelligence (AI) model 131 to perform numerous artificial intelligence operations with appropriate models and algorithms. Without limiting the scope of any embodiment herein, this disclosure incorporates by reference certain commonly owned patents and publications that disclose numerous artificial intelligence models for classify operations, natural language processing, context identification, and concept identification from data inputs across multiple communications channels. This disclosure, therefore, incorporates by reference in their entireties United States Patent Pub. Nos. 2019340243A1 and 2019362252A1 as well as U.S. Pat. Nos. 11,196,863 and 10,109,297. These publications provide details of numerous artificial intelligence operations that may be used in data processing operations of this disclosure.

The artificial intelligence operations parse the first task request data 117A into tokens with a natural language processing component in communication with the virtual assistant service 103. The natural language processing component may be in communication with or even part of a customer conversational artificial intelligence (AI) model 131 that includes the above noted trained AI models and algorithms to extract information from the first task request data 117A submitted to the virtual assistant service 103 by a customer device 105. The kinds of information that the artificial intelligence operations may accomplish include extracting a destination identifier 414 using a natural language processing component to assign tags to the tokens with parts-of-speech identifiers. The virtual assistant service 103 uses the tags to identify nouns in the task request data and assigns each of the nouns a type. The type for each noun may be selected from the group consisting of a person, an object, and a company that will be sufficient to fulfill the requested task via the virtual assistant service. In other non-limiting embodiments, the computer implemented method includes training a customer conversation artificial intelligence (AI) component accessible by the virtual assistant service to assign types of nouns to text spans in the first task request data 117A.

Along the same lines, the computer implemented method of this disclosure includes classifying the intent of the task request data. In non-limiting examples, classifying the intent of the task request data may include using the customer conversational artificial intelligence component to identify concept terms and/or context terms in the task request data. The AI of the customer conversational artificial intelligence component may also map the context terms and the concept terms to intent characteristics stored in a database accessible by the virtual assistant service.

In other non-limiting embodiments, the artificial intelligence operations of the virtual assistant service 103 may classify the intent of the task request data by utilizing at least one computer to parse the task request data into tokens with a natural language processing component in communication with the virtual assistant service, labeling the tokens with identifiers used to assign a context and/or a concept to the tokens, and using a customer conversation artificial intelligence (AI) component accessible by the virtual assistant service to determine an intent of the task to be fulfilled with labeled tokens. The method of this disclosure further includes using the destination entity 142 and the intent from the first task request data 117A to select a communications channel from the application database 126 accessible by the virtual assistant service 103. In other operations, selecting the communications channel may be accomplished according to an availability of training records for the customer conversational artificial intelligence (AI) component 131. The virtual assistant service 103 utilizes the customer conversational artificial intelligence (AI) component 131 in the most efficient way possible to select the communications channel according to cost estimates for the communications channel. The cost estimates may be accessed from the application database 126, having entries regarding the time of completion for the communications channel and/or resource cost for the communications channel. The virtual assistant service 103, therefore, has full access to artificial intelligence computer operations and historical records for training the service to fulfill requested tasks. The AI of this disclosure may check the task instructions to determine a status of task training data available to the virtual assistant service. In some embodiments discussed below in regard to FIG. 4B, the methods of this disclosure further encompass identifying additional data needed to train the virtual assistant service on the task instructions and requesting additional data from the appropriate sources.

Figure 4B:
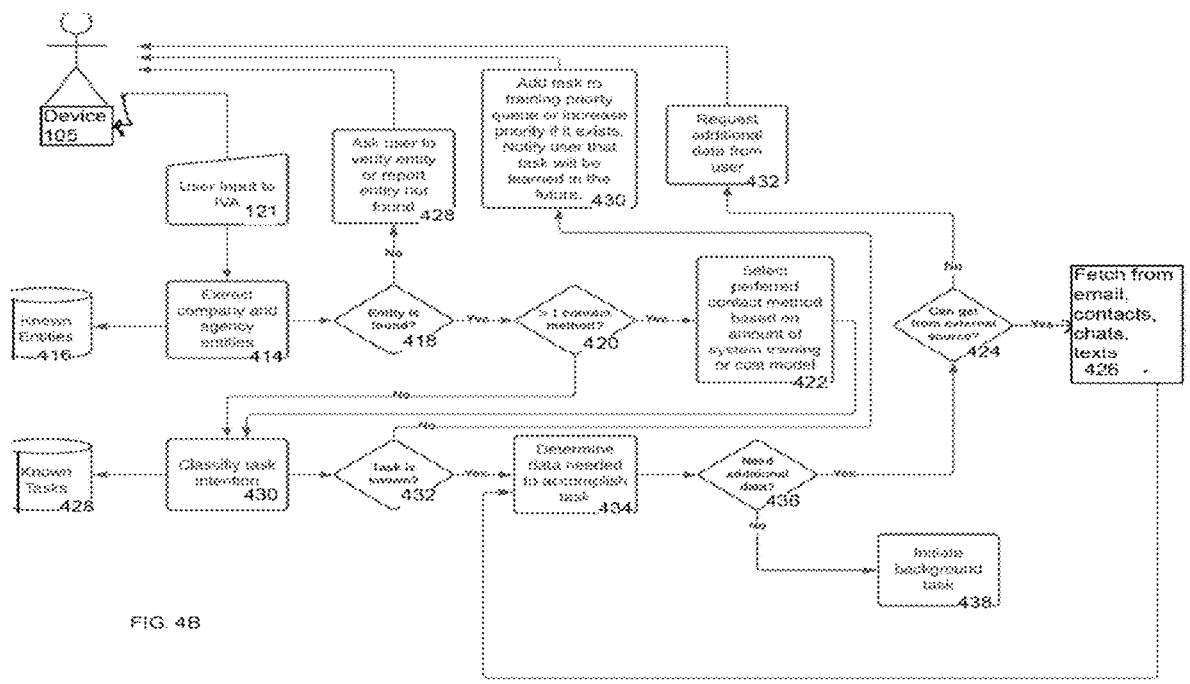
FIG. 4B is an example flow diagram of operations performed to develop content rich instruction data from a customer task request for fulfillment by a destination entity as shown in FIG. 1C according to certain embodiments.

FIG. 4B illustrates an example of how the customer IVA service component 124 may provide numerous communications paths by which the separate communications channel 157 transmits data to the first communications link 107 without interrupting the asynchronous aspects of task fulfillment. For example, when a customer utilizes a customer device 105 and inputs first task request data 117A to the customer IVA service component 124, the customer IVA service component accesses the customer conversational artificial intelligence component 131 to use the above described artificial intelligence models to extract portions of the first task request data 117A to form task instructions 135 for other parts of the virtual assistant service. FIG. 4B shows the procedures of extracting information (such as, but not limited to, company and agency names) related to a requested destination entity 142 that can fulfill the request. The customer conversational artificial intelligence component 131 accesses an application database 126 of known entities 416 to determine if an entity is found 418 that matches the first task request data 117A. If the entity name from the task request data is not found, then the virtual assistant service 103 will ask the user to verify information regarding the entity name 428 and/or advise the user that the entity is not available in the application database 126.

If the entity name is located, then the virtual assistant service 103 utilizes additional records from the application database 126 to determine if there is more than one contact method 420 or communications channel for the entity. For instances in which only one option exists for a communications channel, the virtual assistant service may utilize the customer conversational artificial intelligence component 131 to proceed to classify the intention 430 of the first task request data 117A. Again, the virtual assistant service accesses the records of the task in the application database 126 and may utilize training records therein to implement artificial intelligence operations to determine if a task that has been requested is known 432, determine if additional data is needed to accomplish the task, and if not, then initiate the task 438 as a background operation with respect to the customer device 105. For instances in which more than one contact method exists, the customer conversational artificial intelligence component 131 can be used to select a preferred contact method from either trained AI models matching current communication parameters with historical results or by determining which communication method has been most often used so that a sufficient amount of training records can be used to efficiently effect the communications channel 422. A cost model operation may also be used to select the communications channel with the customer conversational artificial intelligence component 131.

In non-limiting embodiments of this disclosure, classifying the intention of first task request data 117A may be completed with artificial intelligence components to move the task toward completion via the virtual assistant service 103, with either or both of the customer IVA service component 124 and the task model component 118. The artificial intelligence operations utilize training records that may be stored in at least one application database 126. The methods of this disclosure include procedures to address situations in which sufficient data to complete the task is known or even unknown. If the virtual assistant service and its outbound IVA service component 120 need additional data 436, procedures include determining if the virtual assistant service 103 can retrieve the additional data from an external source 424, and if so, then the method fetches the additional data from records including but not limited to email, chat, texts, and other records available in application databases 126. The method continuously checks on the status of its need for additional data until no more data is needed and the task can be completed. If the system determines that available records do not have the additional data needed, then the virtual assistant service can request that data from the user. The virtual assistant service typically contacts the user by utilizing the first communications link 107 connecting the customer IVA service component to the customer device 105.

Figure 4C:
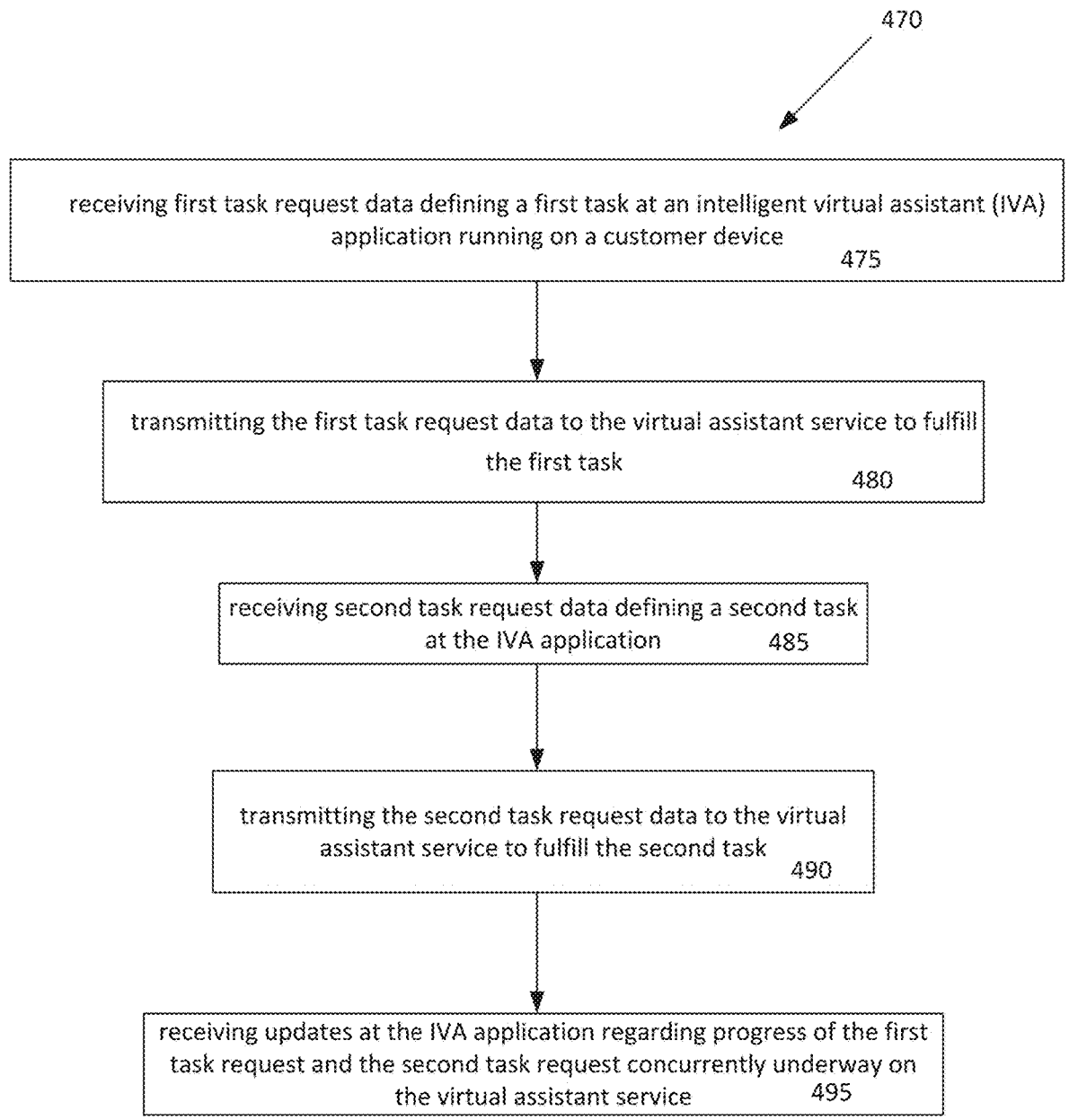
FIG. 4C is a block diagram of a method of using an IVA application on a customer device to access a virtual assistant service according to certain embodiments.

FIG. 4C illustrates one non-limiting implementation of this disclosure as a method 470 of causing a virtual assistant service 103 to fulfill a task request. The method includes, at block 475, receiving first task request data 117A at an intelligent virtual assistant (IVA) application 140 running on a customer device 105. At block 480, the method includes transmitting the first task request data 117A to the virtual assistant service 103 via a first communication link 107 for the virtual assistant service to fulfill the task request with a destination entity 142 communicating with the virtual assistant service 103 on a separate communications channel 157. At block 485, the method incudes receiving a communication 117B related to the first task request data 117A from the virtual assistant service at the IVA application 140 running on the customer device 105. At block 490, the method may include transmitting a response 109A to the communication 117B over the first communications link 107 from the IVA application 140 to the virtual assistant service 103. Block 495 shows receiving updates 109B at the IVA application regarding progress of the task request underway on the virtual assistant service 103.

In some embodiments, receiving first task request data 117A includes receiving the task request data from a smartphone, a desktop computer, a laptop computer, a tablet, or any computer used as a customer device 105. Receiving the communication 117B related to the task request includes receiving a request for a confirmation of content of the task request and/or receiving a request for further information needed by the virtual assistant service 103 or the destination entity 142. Implementations further include receiving the communication 117B by receiving an audio file playable on the customer device.

This disclosure further includes transmitting the response to the communication related to the task request by transmitting a speech response, a text response, and/or a non-speech response initiated by a button in a graphical user interface of the IVA application. The customer device 105 and the IVA application 140 are configured to receive updates regarding the progress of fulfilling the task request from the virtual assistant service 103. In some implementations, the customer device 105 and the IVA application 140 receive the updates in a push notification.

The customer device or any aspect of an overall computer system may include a graphical user interface equipped to display communications related to the task request and any progress on fulfilling the task request by a destination entity. As shown in FIGS. 2A-2D, the customer device may have a graphical user interface that displays a simulated card for each task request running on the IVA application. Displaying each simulated card may include displaying information related to an entity to which the task request pertains and a status of the task request being fulfilled. Each simulated card may include a mechanism for receiving feedback about the task request from a user. In other embodiments, the simulated card may display a transcript 111 of interactions on behalf of the customer as part of the task request. The method of this disclosure may be implemented by a system 101 shown in FIG. 1A. The IVA application 140 of FIGS. 2A— 2D may be implemented as a computer program product according to some embodiments of this disclosure.

In one embodiment, a method 470 causes a virtual assistant service 103 to fulfill a task request 147 on behalf of a customer 229 by receiving first task request data 117A defining a first task 143 at an intelligent virtual assistant (IVA) application 140 running on a customer device 105 and transmitting the first task request data 117A to the virtual assistant service to fulfill the first task 143. The IVA application also receives second task request data 117C defining a second task 225 at the IVA application 140 and transmits the second task request data 117C to the virtual assistant service 103 to fulfill the second task 225. The IVA application 140 receives updates 244 regarding progress of the first task 143 and the second task 225 concurrently underway on the virtual assistant service 103. In some non-limiting embodiments, the customer device 105 utilizes a graphical user interface 205, and the method further includes displaying, on the graphical user interface, the updates 244A related to the first task 143 and the second task 225 underway on the virtual assistant service 103. As shown in FIG. 1B, the graphical user interface 205 may display a respective simulated card 141 for the first task 143 and the second task 225 underway on the virtual assistant service 103. Displaying each simulated card 141 includes displaying information related to a destination entity 142 to which the first task 143 or the second task 225 pertains and a fulfillment status 244B of the first task 143 or the second task 225. In other embodiments, the first task request data 117A is communicated over a first communication link 107, and the second task request data 117C is communicated over a second communication link 113. The first communication link 107 and the second communication link 113 may include different communication channels.

This disclosure also includes embodiments directed to a computer system 600 having a memory 620 with computer-executable instructions and a processor, or CPU 605, configured to execute the computer-executable instructions. The instructions cause the computer system to run an intelligent virtual assistant (IVA) application 140, receive first task request data 117A defining a first task 143 at the IVA application 140 running on a customer device 105, and transmit the first task request data 117A to a virtual assistant service 103 to fulfill the first task 143. The instructions further accommodate receiving second task request data 117C defining a second task 225 at the IVA application 140 and transmitting the second task request data 117C to the virtual assistant service 03 to fulfill the second task 225. The IVA application receives updates 244A regarding progress of the first task 143 and the second task 225 concurrently underway on the virtual assistant service 103. In some non-limiting embodiments, the customer device 105 utilizes a graphical user interface 205, and the computer system 600 further includes displaying, on the graphical user interface, the updates 244A related to the first task 143 and the second task 225 underway on the virtual assistant service 103. As shown in FIG. 1B, the graphical user interface may display a respective simulated card 141 for the first task 143 and the second task 225 underway on virtual assistant service 103. Displaying each simulated card 141 includes displaying information related to a destination entity 142 to which the first task 143 or the second task 225 pertains and a fulfillment status 244B of the first task 143 or the second task 225. In other embodiments, the first task request data 117A is communicated over a first communication link 107, and the second task request data 117C is communicated over a second communication link 113. The first communication link 107 and the second communication link 113 may include different communication channels.

In other embodiments, a non-transitory computer readable medium, such as but not limited to computer storage 630, may include instructions that, when executed by a processor or CPU 605 of a processing system, cause the processing system to run the intelligent virtual assistant (IVA) application 140. In some non-limiting embodiments, the non-transitory computer readable medium is used with a customer device 105 having a graphical user interface 205, and the instructions are configured for displaying, on the graphical user interface, the updates 244A related to the first task 143 and the second task 225 underway on the virtual assistant service 103. As shown in FIG. 1B, the graphical user interface 205 may display a respective simulated card 141 for the first task 143 and the second task 25 underway on virtual assistant service 103. Displaying each simulated card 141 includes displaying information related to a destination entity 142 to which the first task 143 or the second task 225 pertains and a fulfillment status 244B of the first task 143 or the second task 225. In other embodiments, the first task request data 117A is communicated over a first communication link 107, and the second task request data 117C is communicated over a second communication link 113. The first communication link 107 and the second communication link 113 may include different communication channels. In some embodiments, the instructions cause the processing system to display information related to a destination entity 142 communicating with the virtual assistant service 103 on a respective separate communications channel 157. The processing system can display the fulfillment status 244B of the first task 143 and the second task 225 simultaneously. In some embodiments, the first task request data 117A is communicated over a first communication link 107, and the second task request data 117C is communicated over a second communication link 113. The first communication link 107 and the second communication link 113 may be different communication channels.

Figure 5:
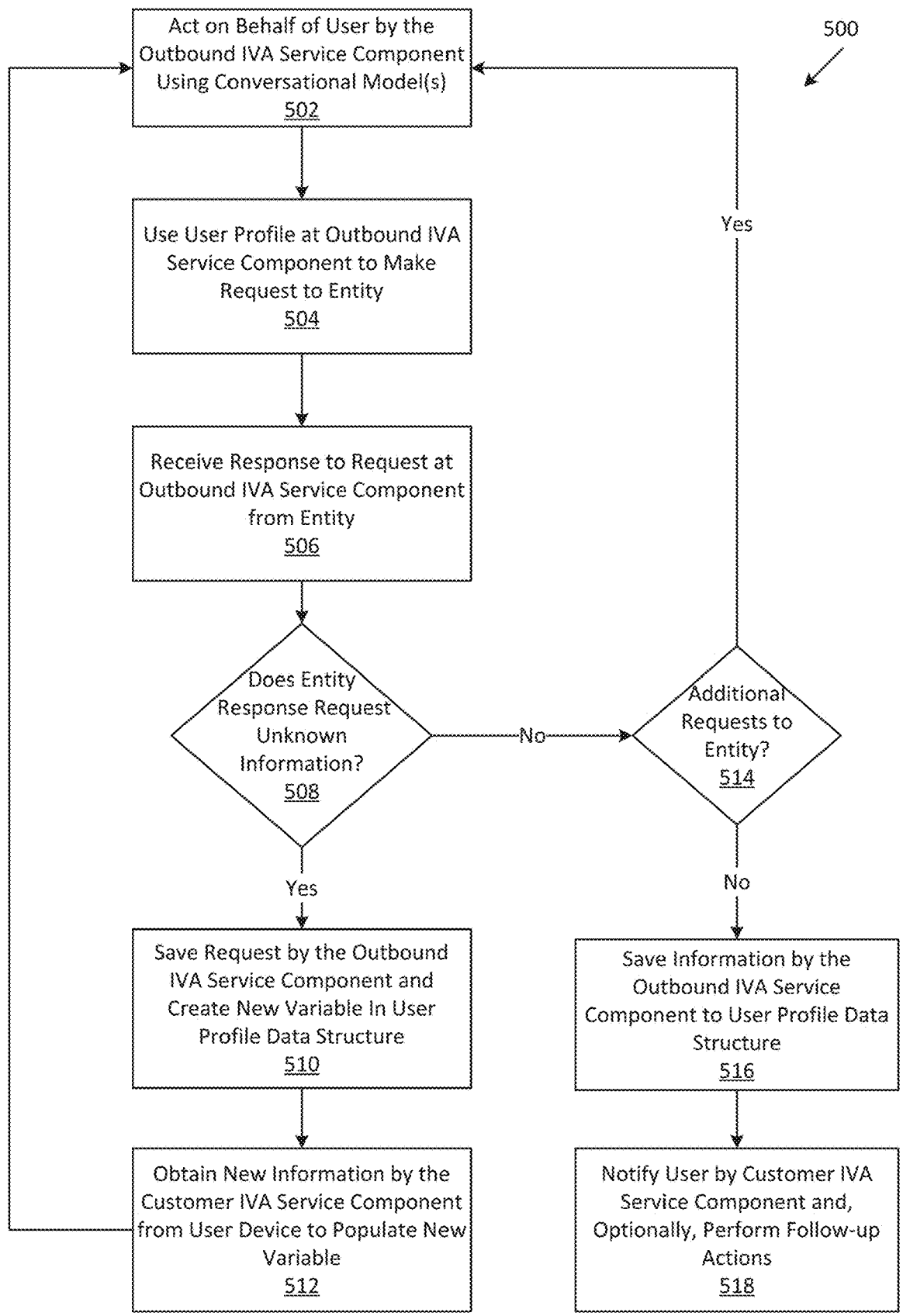
FIG. 5 is an example flow diagram of operations performed to perform the task according to certain embodiments.

FIG. 5 illustrates an example flow diagram 500 of operations performed by the outbound IVA service component 120 according to certain embodiments. At block 502, once communication has been initiated with the destination entity 142 by the outbound IVA service component 120, the selected conversational model from FIG. 4A, block 408 is used to act on behalf of the customer.

At block 504, using the user profile, requests to the entity are made by the outbound IVA service component 120. For example, the request may be made to the entity by the outbound IVA service component 120 through a live agent, and entity IVA, an exposed API, and email, an SMS message, and/or a social post. The outbound IVA service component 120 functions by mapping the delexicalized variable names to the names of the data within the user profile database record. For example, if a customer had populated the profile with the following variables: actor="scott," destination_city="new york city," and departure_date="Apr. 5, 2022" and suppose the contact center agent talking to the IVA were to ask the question "Where are you flying to?" the IVA would generate the response "<actor> would like to fly to <destination_city> on <departure_date>" which would be passed to the user profile injection module that would render the final response as "sally would like to fly to new york city on april fifth twenty two" using variable replacement. Repeating this process for each prompt from the customer service agent will allow the outbound IVA service component 120 to complete a task on behalf of its customer.

At block 506, a response to the request from the destination entity 142 is received by the outbound IVA service component 120. At block 508, it is determined by the outbound IVA service component 120 if the response from the entity requests unknown information. The outbound IVA service component 120 knows what to expect the contact center agent to ask based on an analysis of historical calls/transcripts with people trying to accomplish the same request or task. From this historical data the outbound IVA service component 120 is trained to anticipate similar questions from the contact center agent. This training data is associated to particular intent labels such as "billing address", "account number", or "refund account". Therefore, if a contact center agent 110 asks for something that was not asked for historically in the data used to train the outbound IVA service component 120 for this particular request or task/entity combination, the outbound IVA service component 120 will not be able to use the task model component 118 to map the query into any known intents it has been trained on and it will not be able to provide a response. In those cases, the outbound IVA service component 120 knows that it has been asked for something it has not be trained to provide.

If yes, then at block 510 the request is saved by the outbound IVA service component 120, and a new variable is created in the appropriate customer information (FIG. 3A, 310 or 330) to store the unknown information. For example, in response to Scott Johnson's request to reschedule a flight departing on Apr. 5, 2022, to Apr. 7, 2022, at 8:00 AM, Delta may want to know if Scott Johnson would like to upgrade his seat on the new flight to first class. As the outbound IVA service component 120 does not know this information, it may create a new variable, for example, the column identified as "upgrade" in the customer dynamic flight information 330. The new variable may be a new intent classification that is associated with the contact center agent query received by the task model component 118 back from the destination entity 142. It may be used as a training sample and the delexicalized user response as the response template to the intent to rebuild the customer conversational artificial intelligence (AI) model 131 so next time the outbound IVA service component 120 is asked that question it can respond and continue the task. At block 512, information is obtained by the customer IVA service component 124 from the customer device 105 to populate the new variable. After gathering the new information from the customer, the process returns to block 502.

If at block 508 the entity is requesting unknown information, then it is determined by the outbound IVA service component 120 at block 514 if any additional requests need to be sent from the destination entity 142 to the customer device 105 in order to complete the request or task. The outbound IVA service component 120 may determine a need for the additional information based on further questions from the destination entity's contact center agent 110, API responses from the contact center 102, additional chat questions, or SMS messages received by the outbound IVA service component 120 in accordance with the selected channel. If there are no additional requests for data, then the information from the interaction between the outbound IVA service component 120 and the destination entity 142 is saved at block 516, and the customer is notified at block 518 by the customer IVA service component 124. For example, once the requested task is completed, the outbound IVA service component 120 will save any relevant information received from the destination entity 142 in the appropriate one of dynamic customer purchase information, FIG. 3, 310, or dynamic customer flight information FIG. 3, 330 as data structures. This may include, but is not limited to information, such as a confirmation number, tracking number, expected delivery date, etc. Also, at block 518, the outbound IVA service component 120 and/or customer IVA service component 124 may create a task log after it ends the conversation with the contact center 102. The outbound IVA service component 120 will then notify the customer of the task completion through customer IVA service component 124 and provide the customer with any relevant information that was gathered.

Optionally or additionally at block 518, the outbound IVA service component 120 may perform additional follow-up actions as well such as placing an event or reminder on the customer's calendar. Further optionally or additionally at block 518, if for some reason the task was unsuccessful due to business rules or environmental factors such as the customer did not have sufficient funds in their checking account or needed to fill out a form and sign it, the outbound IVA service component 120 will provide the customer with the next steps they need to take in order to complete the task successfully.

Optionally or additionally, the outbound IVA service component 120 may also contact an entity on behalf of a customer to partially automate a conversation. When asked by its customer to contact an entity on their behalf, the outbound IVA service component 120 will select the optimal channel to contact the entity, place the call, chat, or social contact, and wait for the agent to initiate the conversation. Using the customer profile information, the outbound IVA service component 120 can authenticate the customer and then turn the conversation over to the customer for the remainder of the task. This saves the customer from looking up the company contact information, placing a call, live chat, or social contact, waiting in a queue until an agent has picked up the conversation, and authenticating themselves to the agent. In this way, the outbound IVA service component 120 can partially automate the customer service contact in situations where the customer still wants to handle the conversation themselves, for example, in special circumstances like booking bereavement travel or handling sensitive account changes.

Figure 6:
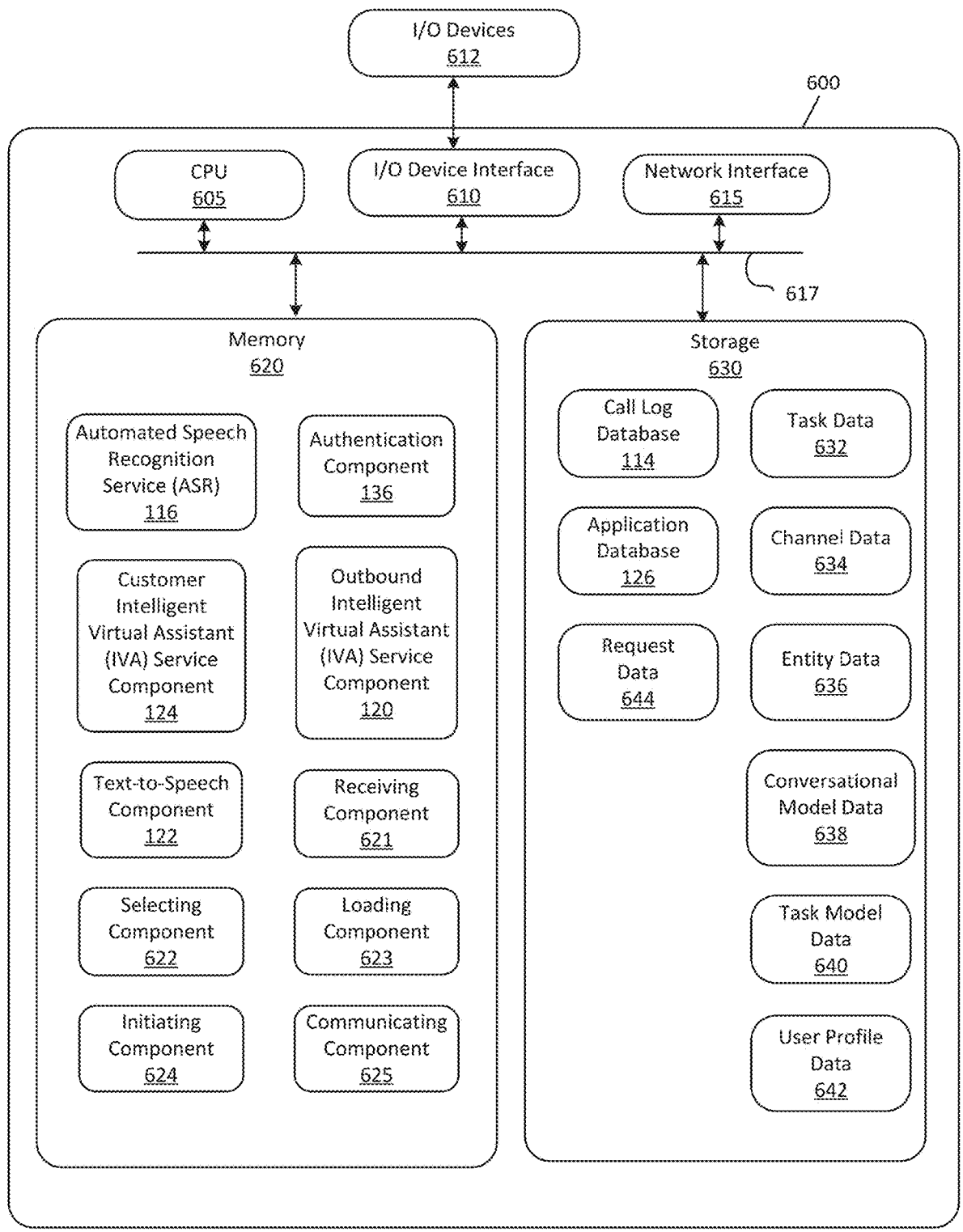
FIG. 6 illustrates example computing systems that may be utilized according to certain embodiments.

FIG. 6 illustrates an example of a computing system 600 that may include the kinds of software programs, data stores, and hardware according to certain embodiments. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, and mouse devices) to the computing system 600. Further, the computing elements shown in computing system 600 may correspond to a physical computing system (e.g., a computing system in a data center) or may be a virtual computing instance executing within a computing cloud.

The CPU 605 retrieves and executes programming instructions stored in memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of random-access memory. The storage 630 may be a disk drive or flash storage device. Although shown as a single unit, the storage 630 may be a combination of fixed and/or removable storage devices, such as fixed disc drives, removable memory cards, optical storage, network-attached storage (NAS), or a storage area network (SAN).

Illustratively, the memory 620 includes the API gateway 149, the automated speech recognition component (ASR) 116, the outbound IVA service component 120, the customer IVA service component 124, the text-to-speech component 122, and the authentication component 136, all of which are discussed in greater detail above. The memory 620 further includes a selecting component 622, a loading component 623, an initiating component 621 and a communicating component 625 that operate in conjunction with, or integrated within, the API gateway 149, the automated speech recognition (ASR) component 116, the outbound IVA service component 120, the customer IVA service component 124, the text-to-speech component 122, and/or the authentication component 136 to perform the operations described herein. In non-limiting embodiments, the memory 620 includes a receiving component 670 and a transmitting component 671.

Further, the storage 630 includes the call log database 114 and the application database 126, all of which are also discussed in greater detail above. The storage 630 also includes task request data 632, channel data 634, entity data 636, conversational model data 638, task model data 640 and user profile data 642. The task data 632 may include, but is not limited to, task-specific information that is obtained by a customer intelligent virtual assistant (IVA) service component 124 in order for the virtual assistance service 103 to act on behalf of the customer. The channel data 634 may include, but is not limited to, information about the channels over which an entity may be contact. The entity data 636, may include, but is not limited to, information about the organization or person being contacted by the outbound IVA service component 120. The conversational model data 638 may include, but is not limited to, the conversational models within the customer conversational artificial intelligence (AI) model 131. The task model data 640 may include, but is not limited to, information utilized by the task model component 118. The user profile data 642 may include, but is not limited to, information contained within the user profiles 127. The storage component may include respective components for storing task request data 660, communications data 662, response data 665, transmitting data 666, confirmation data 667, additional information data 668 and update data 669.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment. For example, the components described herein can be hardware and/or software components in a single or distributed systems, or in a virtual equivalent, such as, a cloud computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Thus, the system 101 and implementations therein described in the present disclosure allow consumers to utilize a virtual assistant contact customer service departments for them and only be involved in the process when needed, saving them time and effort.

What is claimed:

1. A method of causing a virtual assistant service to fulfill a task request on behalf of a customer, the method comprising:
   receiving first task request data defining a first task at an intelligent virtual assistant (IVA) application running on a customer device, wherein the first task relates to a first product or service provider;
   transmitting the first task request data to the virtual assistant service to fulfill the first task;
   receiving second task request data defining a second task at the IVA application, wherein the second task relates to a second product or service provider;
   transmitting the second task request data to the virtual assistant service to fulfill the second task;
   receiving updates at the IVA application regarding progress of the first task and the second task concurrently underway on the virtual assistant service; and
   in response to the updates, updating a fulfillment status displayed to the customer, wherein the fulfillment status includes a measure of task progress relative to completion of the respective task.

2. The method of claim 1, wherein the customer device comprises a graphical user interface, the method further comprising displaying on the graphical user interface the updates related to the first task and the second task underway on the virtual assistant service.

3. The method of claim 1, wherein the customer device comprises a graphical user interface, the method further comprising displaying on the graphical user interface a respective simulated card for the first task and the second task underway on virtual assistant service.

4. The method of claim 3, wherein displaying each simulated card comprises displaying information related to a destination entity to which the first task or the second task pertains and a fulfillment status of the first task or the second task.

5. The method of claim 1, wherein the first task request data is communicated over a first communication link, and the second task request data is communicated over a second communication link.

6. The method of claim 5, wherein the first communication link and the second communication link are different communication channels.

7. A computer system, comprising:
a memory comprising computer-executable instructions; and
a processor configured to execute the computer-executable instructions and cause the computer system to perform a method that causes the computer system to:
run an intelligent virtual assistant (IVA) application;
receive first task request data defining a first task at the IVA application running on a customer device, wherein the first task relates to a first product or service provider;
transmit the first task request data to a virtual assistant service to fulfill the first task;
receive second task request data defining a second task at the IVA application, wherein the second task relates to a second product or service provider;
transmit the second task request data to the virtual assistant service to fulfill the second task;
receive updates at the IVA application regarding progress of the first task and the second task concurrently underway on the virtual assistant service; and
in response to the updates, update a fulfillment status displayed to a customer, wherein the fulfillment status includes a measure of task progress relative to completion of the respective task.

8. The computer system of claim 7, wherein the customer device comprises a graphical user interface, the method further comprising displaying on the graphical user interface the updates related to the first task and the second task underway on the virtual assistant service.

9. The computer system of claim 7, wherein the customer device comprises a graphical user interface, the method further comprising displaying on the graphical user interface a respective simulated card for the first task and the second task underway on the virtual assistant service.

10. The computer system of claim 9, wherein displaying the respective simulated card comprises displaying information related to a destination entity to which the first task or the second task pertains and a fulfillment status of the first task or the second task.

11. The computer system of claim 7, wherein the first task request data is communicated over a first communication link, and the second task request data is communicated over a second communication link.

12. The computer system of claim 11, wherein the first communication link and the second communication link are different communication channels.

13. A non-transitory computer readable medium comprising instructions that, when executed by a processor of a processing system, cause the processing system to:
run an intelligent virtual assistant (IVA) application;
receive first task request data defining a first task at an IVA application running on a customer device, wherein the first task relates to a first product or service provider;
transmit the first task request data to a virtual assistant service to fulfill the first task;
receive second task request data defining a second task at the IVA application, wherein the second task relates to a second product or service provider;
transmit the second task request data to the virtual assistant service to fulfill the second task;
receive updates at the IVA application regarding progress of the first task and the second task concurrently underway on the virtual assistant service; and
in response to the updates, update a fulfillment status displayed to a customer, wherein the fulfillment status includes a measure of task progress relative to completion of the respective task.

14. The non-transitory computer readable medium of claim 13, wherein for a customer device that comprises a graphical user interface, the instructions implement a method further comprising displaying on the graphical user interface the updates related to the first task and the second task underway on the virtual assistant service.

15. The non-transitory computer readable medium of claim 13, wherein for a customer device that comprises a graphical user interface, the instructions implement a method further comprising displaying on the graphical user interface a respective simulated card for the first task and the second task underway on the virtual assistant service.

16. The non-transitory computer readable medium of claim 15, wherein displaying the respective simulated card comprises displaying information related to a destination entity to which the first task or the second task pertains and a fulfillment status of the first task or the second task.

17. The non-transitory computer readable medium of claim 16, wherein the instructions cause the processing system to display information related to a destination entity communicating with the virtual assistant service on a respective separate communications channel.

18. The non-transitory computer readable medium of claim 16, wherein the instructions cause the processing system to display the fulfillment status of the first task and the second task simultaneously.

19. The non-transitory computer readable medium of claim 13, wherein the first task request data is communicated over a first communication link, and the second task request data is communicated over a second communication link.

20. The non-transitory computer readable medium of claim 19, wherein the first communication link and the second communication link are different communication channels.

* * * * *